United States Patent [19]
Kato et al.

[11] Patent Number: 5,381,272
[45] Date of Patent: Jan. 10, 1995

[54] LENS BARREL WITH IMPROVED DRUM ARRANGEMENT

[75] Inventors: Minoru Kato, Kawasaki; Hiroshi Terunuma, Ichikawa; Yoshihiro Takeuchi, Tokyo, all of Japan

[73] Assignee: Nikon Corporation, Tokyo, Japan

[21] Appl. No.: 8,361

[22] Filed: Jan. 22, 1993

[30] Foreign Application Priority Data

Jan. 27, 1992 [JP] Japan .............................. 4-002434[U]
Sep. 25, 1992 [JP] Japan .................................. 4-256968

[51] Int. Cl.6 ................................................ G02B 7/02
[52] U.S. Cl. ...................................... 359/823; 359/826
[58] Field of Search ......................... 359/823, 825, 826

[56] References Cited

U.S. PATENT DOCUMENTS

| 3,119,891 | 1/1964 | Ferrari et al. | 359/826 |
|---|---|---|---|
| 3,744,884 | 7/1973 | Filipovich et al. | 359/823 |
| 4,564,264 | 1/1986 | Komoto | 359/825 |
| 4,822,153 | 4/1989 | Tomori et al. | 359/825 |
| 5,144,493 | 9/1992 | Nomura | 359/825 |

FOREIGN PATENT DOCUMENTS

| 0122003 | 9/1981 | Japan | 359/825 |
|---|---|---|---|
| 63-98638 | 4/1988 | Japan | . |
| 64-62607 | 3/1989 | Japan | . |
| 3-7919 | 1/1991 | Japan | . |
| 3-209412 | 9/1991 | Japan | . |

*Primary Examiner*—Edward K. Look
*Assistant Examiner*—Mark Sgantzos
*Attorney, Agent, or Firm*—Shapiro and Shapiro

[57] ABSTRACT

A lens barrel including a fixed drum, a rotary drum rotatably fitted in the fixed drum and a lens drum, disposed in the rotary drum, for accommodating lens. The lens drum is movable in the optical-axis direction of the lens with a rotation of the rotary drum. The lens barrel has an adjusting drum disposed in a subject-side position between the fixed drum and the rotary drum. The adjusting drum thread-engages with the fixed drum. The adjusting drum is, when rotated, moved in the optical-axis direction. With this movement, the rotary drum and the lens drum also move in the optical-axis direction, thus adjusting a relative position of the rotary drum with respect to the fixed drum.

6 Claims, 5 Drawing Sheets

LENS BARREL WITH IMPROVED DRUM ARRANGEMENT

BACKGROUND OF THE INVENTION

Field of the Invention

The present invention relates to a lens barrel.

Related Background Art

As disclosed in, e.g., Japanese Patent Application Laid-Open No. 3-209412, a known lens barrel has hitherto been constructed in the following manner. A rotary drum is rotatably fitted in a fixed drum. At the same time, the rotary drum incorporates a lens drum for accommodating lenses. With a rotation of the rotary drum, the lens drum is movable in the optical-axis direction of the lenses.

In the conventional lens barrel described above, however, only a portion of the rotary drum on the side of a film surface is fitted to the fixed drum, whereas a subject-side portion thereof is not fitted to the fixed drum. The rotary drum may therefore be tilted with respect to the fixed drum. This causes a possibility in which the lens drum accommodating the lenses may be tilted. Further, there is a probability wherein when a gear formed on the subject-side portion of the rotary drum is rotated by a driving gear, a sufficient moment is generated to exert a load on the rotation of the rotary drum.

Figure 6:
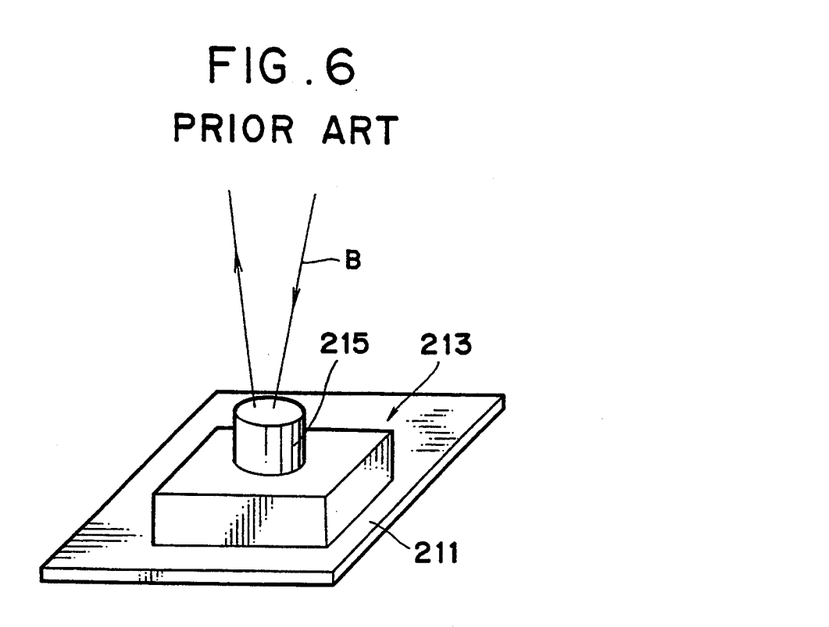
FIG. 6 is a view showing a method of adjusting a position of the lens drum in the prior art.

In the conventional lens barrel, the lens drum is hard to locate in a predetermined initial position due to working and assembling errors, etc. Therefore, the following practice has been conducted. During a manufacturing process, as illustrated in FIG. 6, a lens drum 215 of a camera 213 is disposed upwards on a horizontal specular surface 211. A beam B is incident on the lens drum 215, and the light reflected by the specular surface 211 is measured. Based on this measurement, a position of the lens drum 215 is adjusted. In this case, according to the conventional lens barrel, the positional adjustment of the lens drum 215 is allowed to be effected only from the rear surface of the camera 213. The camera 213 has to be turned over. This leads to a problem that a large number of working steps are required for the positional adjustment of the lens drum 215.

Another type of lens barrel is constructed to move the lens in the optical-axis direction by relatively rotating a pair of cam drums coaxially arranged.

This type of known lens barrel is disclosed in, e.g., Japanese Patent Application Laid-Open No. 63-98638. The following is an explanation of this lens barrel with reference to FIG. 7.

Figure 7:
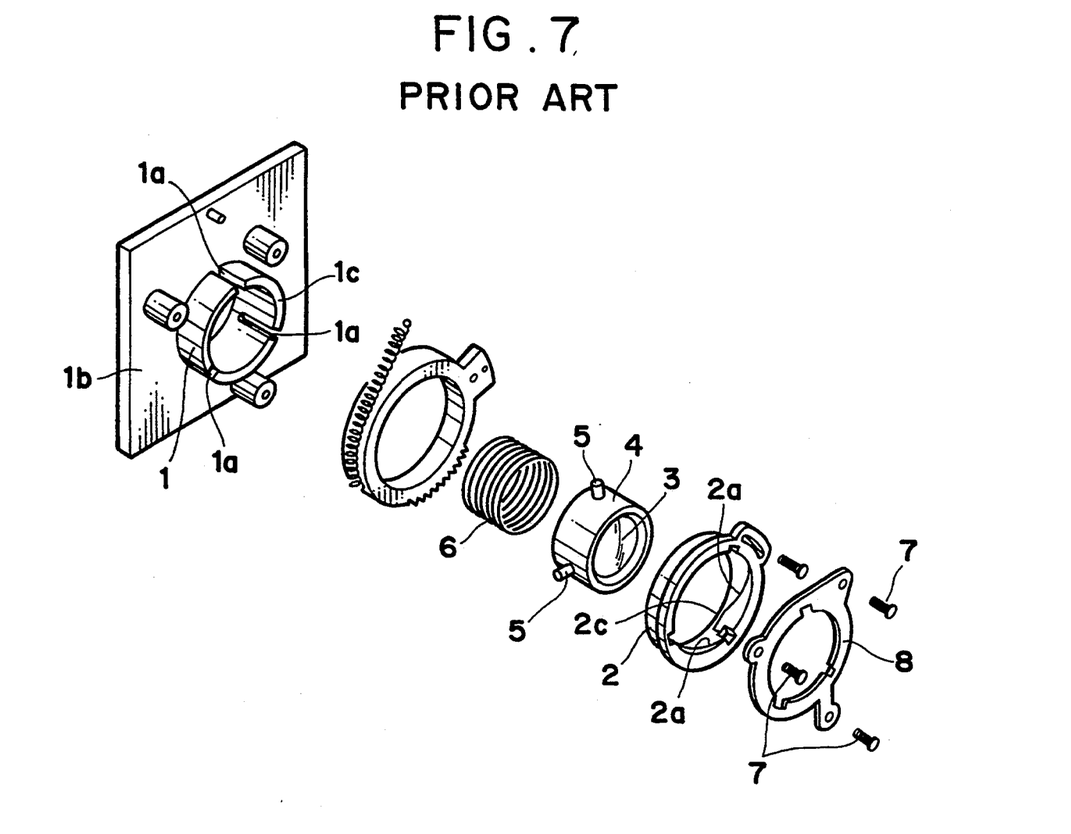
FIG. 7 is an exploded perspective view illustrating a construction of a lens barrel in the prior art.

As depicted in FIG. 7, the lens barrel shown in the above-mentioned publication includes a first cam drum 1, a second cam drum 2, a lens holder 4, a spring 6 and a cam stop ring 8. The first cam drum 1 is formed with three rectilinear slots 1a cut in the radial direction and extending in parallel to the axial line. The second cam drum 2 is fitted to the outer periphery of the first cam drum 1 and formed with three helical slots 2a (only two slots are shown in the Figure) helically cut in the inner peripheral surface about the axial line. A lens 3 is secured to the inner periphery of the lens holder 4 fitted to the inner periphery of the first cam drum 1. The cam pins 5 protrude from the outer periphery of the lens holder 4 and pass through the rectilinear slots 1a of the first cam drum 1. Tips of the cam pins 5 engage with the helical slots 2a of the second cam drum 2. The spring 6 is arranged between a flange 1b of the first cam drum 1 and the lens holder 4. The spring 6 pushes the cam pins 5 against the helical slots 2a. The cam stop ring 8 secured to the flange 1b of the first cam drum 1 prevents the second cam drum 2 from coming off in the axial direction due to a resilient force of the spring 6. When the second cam drum 2 is rotated about the first cam drum 1, the cam pins 5 are thrust out in the optical-axis direction of the lens 3 in accordance with the helix angle of each of the helical slots 2a. The lens holder 4 then moves in the optical-axis direction. A focal distance of the lens 3 is thus adjusted.

In the lens barrel described above, the rectilinear slots 1a of the first cam drum 1 and the helical slots 2a of the second cam drum 2 are both formed in the end surfaces 1c, 2c of these cam drums 1, 2 that face in the assembling direction. With this arrangement, when assembling the lens holder 4 and the second cam drum 2 to the first cam drum 1, the cam pins 5 are attached to the outer periphery of the lens holder 4. Thereafter, the lens holder 4 is inserted into the first cam drum 1. Then, the second cam drum 2 may be covered thereon. The work is thereby facilitated.

Where the rectilinear slots of the first cam drum 1 are formed in the end surface 1c, however, the end portions of the first cam drum 1 are split in the peripheral direction enough to decrease a rigidity thereof. These end portions may thus deform in the radial direction and rub against the lens holder 4 and the second cam drum 2 as well. The actions of the lens holder 4 and the second cam drum 2 may become unsmooth in some cases.

To obviate this defect, if the rectilinear slots 1a are formed as elongate holes without being cut in the end surface 1c, the cam pins 5 hinder the lens holder 4 from being fitted to the inner periphery of the cam drum 1. Accordingly, it is required that the cam pins 5 be attached from the outer periphery of the cam drum 1 by aligning the rectilinear slots 1a with screw holes for attaching the cam pins 5 after inserting the lens holder 4 into the cam drum 1. For this reason, the work becomes troublesome. At the same time, there arises a possibility wherein declines both in operation of the lens barrel and in optical performance are produced due to a deterioration in attachment of the cam pins 5.

SUMMARY OF THE INVENTION

It is a primary object of the present invention in accordance with a first embodiment thereof to provide a lens barrel capable of surely obviating a possibility in which a rotary drum is tilted with respect to a fixed drum and easily adjusting a position of a lens drum from the side of a subject.

It is another object of the present invention in accordance with a second embodiment thereof to provide a lens barrel capable of facilitating an assembling work of a lens holder to a cam drum and preventing declines in operations of the cam drum and the lens holder due to a deformation of the cam drum.

A lens barrel in the first embodiment of the present invention includes a fixed drum, a rotary drum rotatably fitted in said fixed drum and a lens drum, disposed in said rotary drum, for accommodating lenses. The lens drum is movable in the lens optical-axis direction with a rotation of the rotary drum. The lens barrel has an adjusting drum disposed in a subject-side position between the fixed drum and the rotary drum. The adjusting drum thread-engages with the fixed drum. The adjusting drum is, when rotated, moved in the optical-axis direction. With this movement, the rotary drum and the lens drum also move in the optical-axis direction, thus adjusting a relative position of the rotary drum with respect to the fixed drum.

Preferably a presser member for regulating a relative position between the adjusting drum and the rotary drum is disposed so that the presser member is held on the rotary drum and impinges on an end surface of the adjusting drum on the object side. More preferably, the presser member is fixedly set in grooves cut in the rotary drum by spring forces.

The lens barrel in the first embodiment of the present invention is capable of surely obviating a possibility in which the rotary drum is tilted with respect to the fixed drum and readily adjusting a position of the lens drum from the side of a subject.

A lens barrel in accordance with a second embodiment of the present invention comprises, a first cam drum formed with first cam slots cut in the radial direction, a second cam drum fitted to the exterior of the first cam drum and formed with second cam slots cut in the inner peripheral surface, and a lens holder, fitted inwardly of the first cam drum, for holding lenses internally. The second cam slots extend obliquely across the first cam slots. The first and second cam slots are each formed in end surfaces of the first and second cam drums that face in the assembling direction. Cam pins protruding from the outer periphery of the lens holder pass through the first cams so that tips of the cam pins engage with the second cam slots. The lens barrel further comprises a come-off preventive (stop) member for hindering relative movements of the first and second cam drums in the axial direction. The come-off preventive member is fixed to an end surface of the first cam drum that faces in the assembling direction. The come-off preventive member connects end portions of the first cam drum split by the first cam slots in the peripheral direction to each other.

According to the lens barrel in the second embodiment of the present invention, the first and second cam slots are cut in the end surfaces of the first and second cam drums that face in the assembling direction. Hence, the cam drum and the lens holder can be assembled after attaching the cam pins to the lens holder. The work is thus simple. Further, the end portions of the first cam drum split by the first cam slots are connected by the come-off preventive member, thereby preventing a deformation in the radial direction. Besides, the end portions of the first cam drum are connected by the come-off preventive member which has hitherto been provided for hindering the relative movements of the first and second cam drums. Therefore, the number of steps of assembling the lens barrel and the costs for production do not increase with no increment in the number of parts.

BRIEF DESCRIPTION OF THE DRAWINGS

Other objects and advantages of the present invention will become apparent during the following discussion in conjunction with the accompanying drawings, in which.

DETAILED DESCRIPTION OF THE PREFERRED EMBODIMENTS

Figure 1:
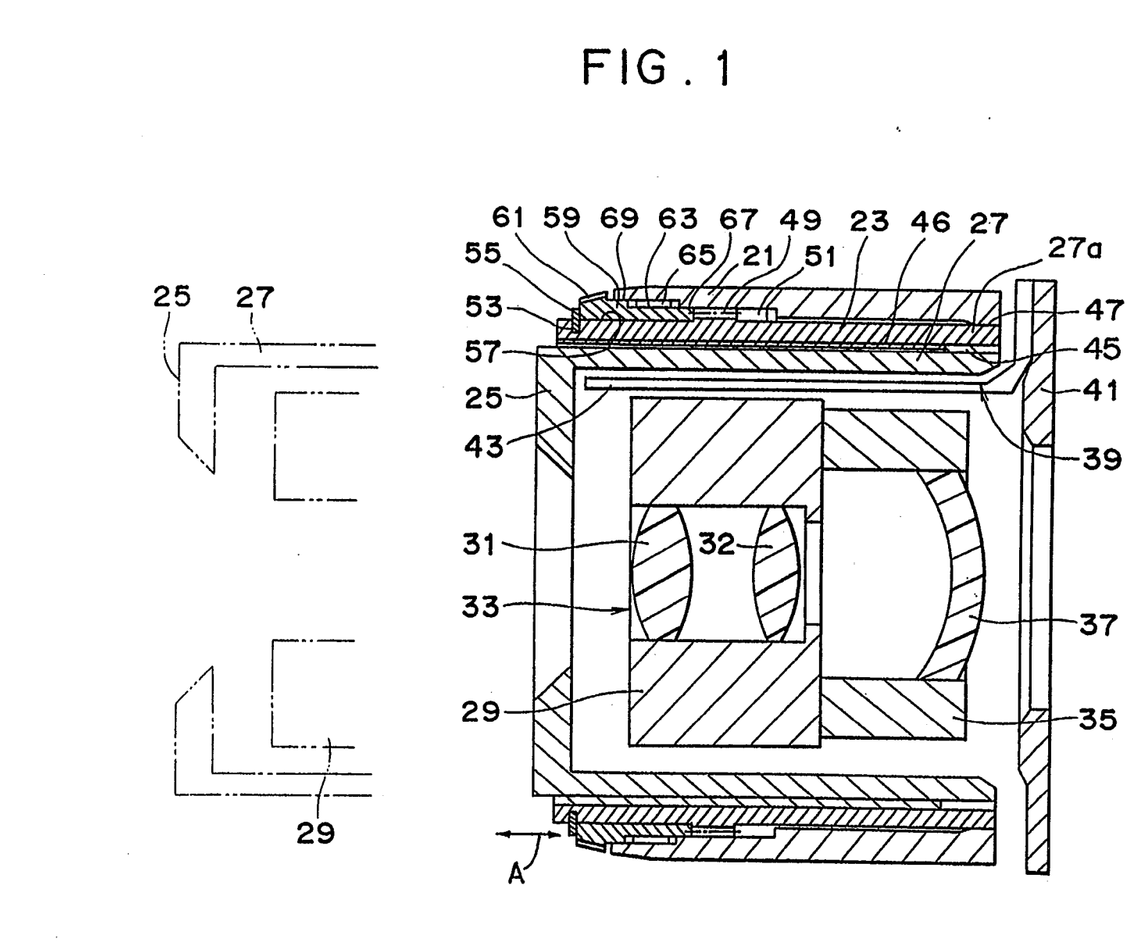
FIG. 1 is a sectional view illustrating a lens barrel in a first embodiment of the present invention.

FIG. 1 shows one embodiment of a lens barrel of this invention. Referring to FIG. 1, the numeral 21 designates a cylindrical fixed drum for providing a dark box (housing).

A cylindrical rotary drum 23 is rotatably fitted in this fixed drum 21.

Then, a lens drum 27 having an inner flange 25 on the side of a subject is incorporated into the rotary drum 23.

A lens shutter 29 is fixed in the lens drum 27. This lens shutter 29 accommodates a first lens group 33 consisting of two lenses 31, 32.

A support member 35 is disposed adjacent to the lens shutter 29. A second lens group 37 is accommodated in this support member 35.

A key plate 39 is disposed inwardly of the lens drum 27. One end of the key plate 39 is fixed to a camera body 41.

A key part 43 of the key plate 39 engages with an unillustrated engagement part formed on the lens drum 27. With this arrangement, the lens drum 27 is movable only in the optical-axis direction.

Trapezoidal threads 45 are formed on an end part 27a along the outer periphery of the lens drum 27. These trapezoidal threads 45 engage with trapezoidal threads 46 formed over the entire length of the inner periphery of the rotary drum 23.

A fitting part 47 is formed on the outer periphery of the rotary drum 23 on the side of the camera body 41. This fitting part 47 is fitted directly in the fixed drum 21.

A gear 49 meshing with an unillustrated driving gear is formed on the outer peripheral part, closer to the camera body 41 than the center, of the rotary drum 23.

Further, a protrusion 51 for switching ON/OFF an unillustrated reset switch is formed adjacent to this gear 49 on the side of the camera body.

Annular grooves 53 are cut in the outer periphery of the rotary drum 23 on the side of the subject. An inner part of an annular presser member 55 is inserted in these grooves 53.

A fitting surface 57 is formed between the gear 49 and the grooves 53 cut in the outer periphery of the rotary drum 23. The inner periphery of a cylindrical adjusting drum 59 is rotatably fitted to this fitting surface 57.

A knurl 61 for rotating the adjusting drum 59 is formed in the outer periphery of the adjusting drum 59 on the side of the subject.

A threaded part 63 is formed on the outer periphery of the adjusting drum 59 on the side of the camera body. The threaded part 63 engages with a threaded part 65 formed in the fixed drum 21 on the side of the subject.

Further, fitting surfaces 67, 69 are formed on both sides of the threaded part 63 of the adjusting drum 59. These fitting surfaces 67, 69 are fitted in the inner periphery of the fixed drum 21.

Figure 2:
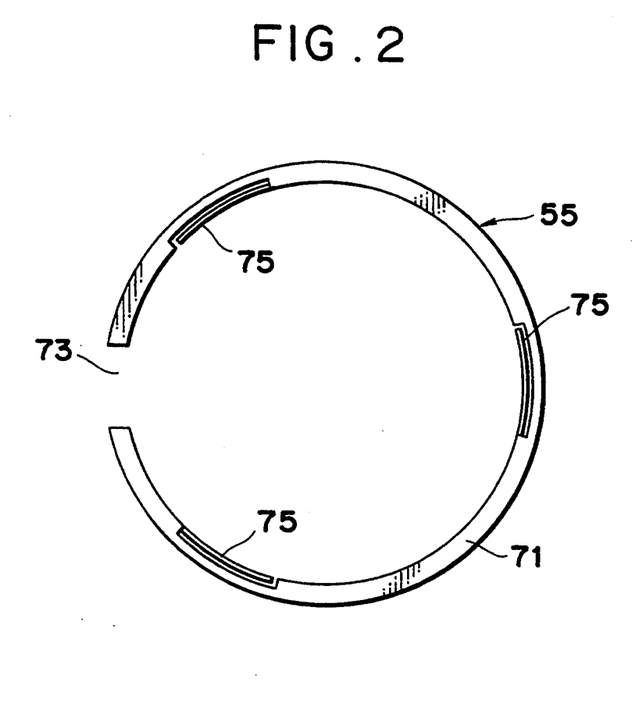
FIG. 2 is a top view showing a presser member 55 shown in FIG. 1.

FIG. 2 fully illustrates the presser member 55 inserted in the grooves 53 cut in the rotary drum 23. This presser member 55 assumes an annular configuration, wherein an opening 73 is formed in one location of an annular body unit 71; and spring parts 75 are formed at intervals of predetermined angles inwardly of the body unit by notching portions of the body unit 71 and folding them in one direction.

Figure 3:
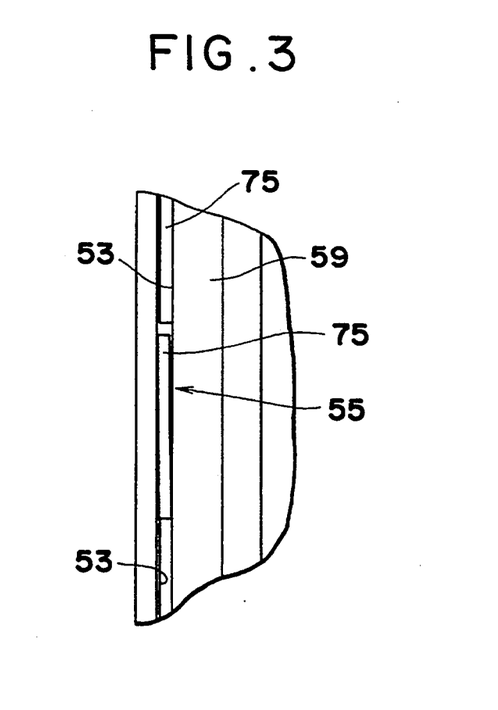
FIG. 3 is a side view of the presser member 55.

Then, this presser member 55 is, as illustrated in FIG. 3, fixed in the grooves 53 by spring forces of the spring parts 75 inserted in the grooves 53. The presser member 55 is thus located in a predetermined position.

The following is an explanation of how the above-mentioned lens barrel operates.

FIG. 1 illustrates the condition in an OFF-state of the unillustrated reset switch fixed to the fixed drum 2 when this switch is depressed by the protrusion 51 of the rotary drum 23.

When driving the unillustrated driving gear meshing with the gear 49 of the rotary drum 23 from this state, the gear 49 rotates. Concomitantly, the rotary drum 23 rotates. The protrusion 51 separates from the reset switch, thus turning ON the reset switch.

Then, with a further drive of the unillustrated driving gear, the rotary drum 23 rotates. The lens drum 27 thread-engaging with this rotary drum 23 moves in the optical-axis direction with the action of the key plate 39, thereby extending the lens drum 27.

An unillustrated control unit detects a quantity of rotation of the rotary drum 23 after turning ON the reset switch. When reaching a predetermined quantity of rotation, the drive of the unillustrated driving gear is halted. The lens drum 27 stops in, e.g., a position indicated in phantom in FIG. 1. Photographing takes place in this position.

In the lens barrel described above, the reset switch is turned ON when the protrusion 51 of the rotary drum 23 separates from the reset switch; and the control unit detects the quantity of rotation of the rotary drum 23 after turning ON the reset switch. It is therefore required that the lens drum 27 be located in a predetermined initial position when the reset switch is turned ON with a shift of the protrusion 51. If not in the predetermined initial position, a focus through a lens deviates from the film surface. The illustrative construction facilitates location of the lens drum 27 in the predetermined initial position when the reset switch is turned ON by the protrusion 51 while accommodating working and assembling errors with respect to the individual members shown in FIG. 1.

More particularly, in the lens barrel in accordance with this embodiment, the positions of the rotary drum 23 and the lens drum 27 are integrally shifted, as indicated by double-headed arrow A in FIG. 1, by rotating the adjusting drum 59 located between the presser member 55 and the gear 49. When the reset switch is turned ON by the protrusion 51, an adjustment is made to locate the lens drum 27 in the predetermined initial position.

This adjustment makes it possible to obtain a precise focus without altering a control value of the ON-state of the reset switch and a mounting position of the reset switch.

Note that the adjusting drum 59 is, after effecting the adjustment, fixed to the fixed drum 21 with a bonding agent or the like.

According to the thus constructed lens barrel, the adjusting drum 59 thread-engaging with the fixed drum 21 adjusts a relative position of the rotary drum 23 to the fixed drum 21. The adjusting drum 59 is disposed between the fixed drum 21 and the rotary drum 23 on the side of the subject. It is thus feasible to surely eliminate a possibility in which the rotary drum 23 is tilted with respect to the fixed drum 21. At the same time, the positional adjustment of the lens drum 27 can be easily performed on the side of the subject.

More specifically, in the lens barrel described above, the subject-side portion of the rotary drum 23 is supported on the fixed drum 21 through the adjusting drum 59. The rotary drum 23 is not therefore tilted with respect to the fixed drum 21. As a result, the lens drum 27 is also not tilted. Further, when driving the gear, no load acts on the rotation of the rotary drum 23.

Also, because the adjusting drum 59 is rotated on the subject side, it is possible to adjust the position of the lens drum 27 without turning over the camera. The number of working steps for the adjustment can be remarkably reduced.

Furthermore, the above-explained lens barrel is provided with the presser member 55 held on the rotary drum 23 and impinging on the end surface of the adjusting drum 59 on the subject side. The relative position between the rotary drum 23 and the adjusting drum 59 can therefore be exactly regulated.

In the illustrative embodiment, the presser member 55 is formed with the spring parts 75, inserted in the grooves 53 cut in the rotary drum 23, for fixing the presser member in the grooves 53 by the spring forces thereof. The presser member 55 is thus fixed in the grooves 53 with the aid of the spring parts 75 and is not therefore biased toward the adjusting drum 59. Hence, it is possible to reduce a friction with the adjusting drum 59 of the presser member 55 during a rotation of the rotary drum 23.

Figure 4:
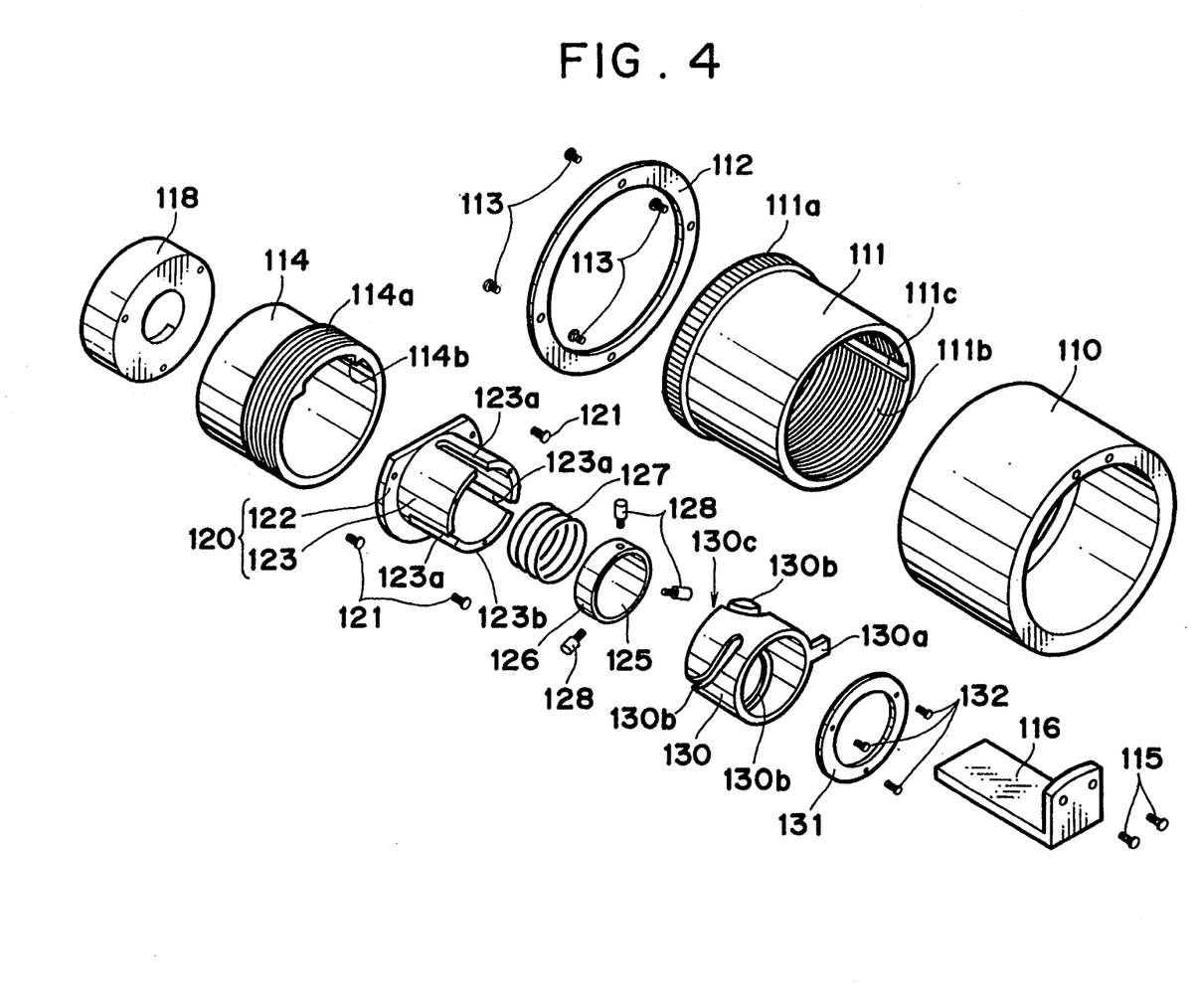
FIG. 4 is an exploded perspective view of a lens barrel in a second embodiment.
Figure 5:
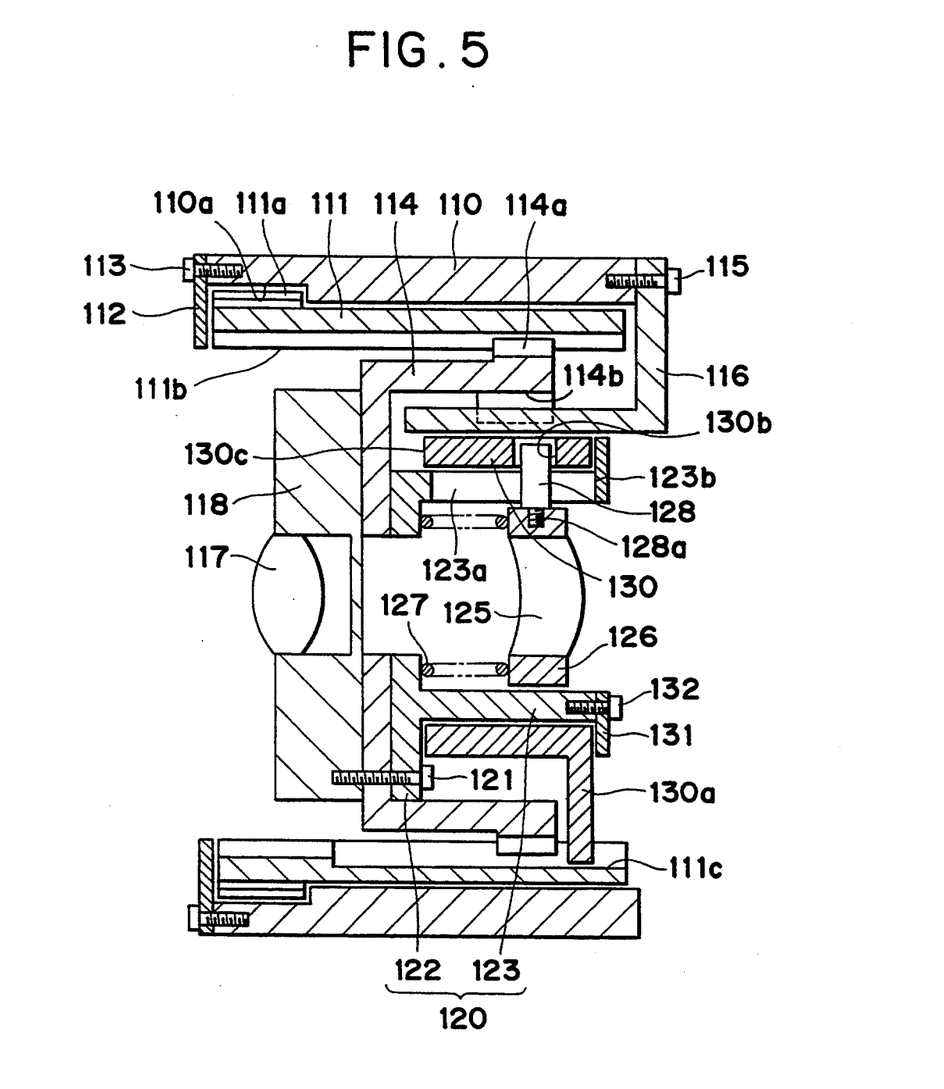
FIG. 5 is a sectional view taken in the axial direction, showing a state where the lens barrel is assembled.

Another embodiment of the present invention will now be explained with reference to FIGS. 4 and 5.

In these Figures, a cylindrical dark box (housing) 110 serves as a base of the lens barrel. A driving drum 111 is rotatably fitted to the inner periphery of the cylindrical dark box 110. Teeth 111a are protrusively formed in the radial direction along the outer periphery of one end portion of the driving drum 111. The teeth 111a are accommodated in a diameter-expanded part 110a along the inner periphery of the dark box 110. A stop ring 112 is then fixed to one end of the dark box 110 with screws 113. An axial movement of the driving drum 111 with respect to the dark box 110 is thus hindered. Hereafter, the axial direction of the dark box 110 is called an optical-axis direction; the left side in FIG. 5 is called a front side of the lens barrel; and the right side therein is called a rear side of the lens barrel.

The teeth 111a of the driving drum 111 are exposed to the outside from an unillustrated notched portion formed in the peripheral surface of the dark box 110. The teeth 111a thus mesh with an unillustrated lens driving gear. The lens driving gear is connected to an unillustrated lens driving motor. The driving drum 111 rotates about the axial line in accordance with an angle of rotation of an output shaft of this lens driving motor. Female helicoid threads 111b are cut in the inner periphery of the driving drum 111. These female helicoid threads 111b mesh with male helicoid threads 114a of an inner drum 114 fitted to the inner periphery of the driving drum 111. The inner drum 114 has a key way 114b cut in the inner periphery thereof. The key way 114b engages with a rectilinear key 116 fixed to the other end of the dark box 110 with screws 115. A rotation of the inner drum 114 is thereby hindered. With this arrangement, when the driving drum 111 rotates, the inner drum 114 moves rectilinearly in the optical-axis direction by a quantity corresponding to the angle of rotation of the driving drum 111.

Disposed at one end of the inner drum 114 are a first lens group 117 and a shutter ring 118 incorporating an unillustrated shutter blade-set. This shutter ring 118 is fixed on the inner drum 114 by means of a screw 121 together with a rectilinear guide 120 inserted into the inner drum 114 from the rear of the lens barrel. The shutter ring 118 moves integrally with the inner drum 114 in the optical-axis direction.

The rectilinear guide 120 includes a flange 122 fixed to the inner drum 114 and a guide drum (first cam drum) 123 cylindrically protruding from this flange 122. The guide drum 123 has three rectilinear slots 123a cut there through in the radial direction and extending straight in the optical-axis direction. These rectilinear slots 123a are formed in an end surface 123b of the guide drum 123 which is directed to the rear of the lens barrel. A lens holder 126 and a spring 127 are inserted into the guide drum 123 of the rectilinear guide 120 from the rear of the lens barrel. The lens holder 126 incorporates a second lens group 125. The spring 127 acts to bias the lens holder 126 toward the rear of the lens barrel. The same number of cam pins 128 as the number of the rectilinear slots 123a are attached to the outer periphery of the lens holder 126 at equal pitches in the peripheral direction in such a manner that threaded parts 128a thereof are screwed into the lens holder 126. These cam pins 128 are inserted in the rectilinear slots 123a from the open ends of the rectilinear slots 123a when assembling the lens holder 126 to the guide drum 123 of the rectilinear guide 120.

A rotary cam ring (second cam drum) 130 is fitted to the outer peripheral portion of the guide drum 123 of the rectilinear guide 120 from the rear of the lens barrel. This rotary cam ring 130 has a key 130a formed on one end thereof. The key 130a engages with a key way 111c cut in the inner periphery of the driving drum 111, whereby the rotary cam ring 130 is rotatable integrally with the driving drum 111. The rotary cam ring 130 includes three helical slots 130b helically formed about the optical axis at equal pitches in the peripheral direction. These helical slots 130b are formed in an end surface 130c of the rotary cam ring 130 that faces in the assembling direction to the guide drum 123. When assembling the rotary cam ring 130 to the guide drum 123, the helical slots 130b engage with the tips of the cam pins 128 protruding from the rectilinear slots 123a.

An annular cam stop ring 131 is fixed to the end surface 123b of the rectilinear guide 120 with three screws 132. This cam stop ring 131 protrudes in the radial direction from the outer peripheral surface of the guide drum 123. The cam stop ring 131 prevents the rotary cam ring 130 from coming off the guide drum 123 toward the rear of the lens barrel due to a force of the spring 127 that is transmitted to the rotary cam ring 130 through the lens holder 126 and the cam pins 128. The screws 132 for fixing the cam stop ring 131 are screwed one by one into the end portions of the guide drum 123 split into three segments in the peripheral direction by the rectilinear slots 123a. The end portions of the guide drum 123 are thereby connected to each other through the cam stop ring 131.

In the thus constructed lens barrel, as explained before, the inner drum 114 moves integrally with the first lens group 117 in the optical-axis direction in accordance with the angle of rotation of the driving drum 111. At the same time, the rotary cam ring 130 rotates about the guide drum 123 of the rectilinear guide 120 integrally with the driving drum 111. The cam pins 128 are thereby thrust out in the optical-axis direction in accordance with the helix angle of each of the helical slots 130b while being guided by the rectilinear slots 123a. The second lens group 125 then moves in the optical-axis direction while altering a relative distance to the first lens group 117.

In the lens barrel in accordance with this embodiment, the rectilinear slots 123a of the rectilinear guide 120 and the helical slots 130b of the rotary cam ring 130 are formed in the end surfaces 123b, 130c of the rotary cam ring 130 and the guide drum 123 of the rectilinear guide 120 that face in the assembling direction. Hence, the cam pins 128 are previously attached to the lens holder 126. Thereafter, the lens holder 126 and the rotary cam ring 130 can be fitted to the guide drum 123 of the rectilinear guide 120. More specifically, the lens holder 126 is fitted to the inner periphery of the guide drum 123 of the rectilinear guide 120 while inserting the cam pins 128 attached to the lens holder 126 into the rectilinear slots 123a from the openings thereof. Further, the rotary cam ring 130 may be fitted to the outer periphery of the guide drum 123 while engaging the helical slots 130b of the rotary cam ring 130 with the cam pins 128 from the openings thereof. The work can be therefore more easily performed than in attaching the cam pins 128 afterward. Besides, there is no possibility to cause a deterioration in attaching the cam pins 128.

Further, the end portions of the guide drum split into the three segments by the rectilinear slots 123a are connected to each other through the cam stop ring 131, thereby hindering a deformation in the radial direction. Consequently, there exists no possibility to deteriorate the actions of the lens holder 126 and the rotary cam ring 130 due to the lens holder 126 and the rotary cam ring 130 rubbing intensively against the guide drum 123. The cam stop ring 131 as an indispensable part for preventing the rotary cam ring 130 from coming off the guide drum 123 is used in common as a member for connecting the end portions of the guide drum 123. Accordingly, there is also no increase in the number of steps of assembling the lens barrel or the costs for production, and no increase in the number of parts.

The first cam slots are not necessarily disposed in parallel to the optical-axis direction. An adequate arrangement is that the first cam slots may obliquely intersect the second cam slots. For instance, the first cam slot may be a helical slot, while the second cam slot may be a rectilinear slot parallel to the optical axis. The second cam slot may be formed in only the inner peripheral surface of the second cam drum as in the case of the helical slot 2a in FIG. 7 without being cut through in the radial direction. The come-off preventive member is not limited to the ring-like configuration. Any suitable configuration may be used on condition that the end portions of the first cam drum split by the cam slots can be connected to each other.

Although the illustrative embodiments of the present invention have been described in detail with reference to the accompanying drawings, it is to be understood that the present invention is not limited to those embodiments. Various changes or modifications may be effected by one skilled in the art without departing from the scope or spirit of the invention.

What is claimed is:

1. A lens barrel comprising:

a fixed drum;

a rotary drum rotatably fitted in said fixed drum;

a lens drum, disposed in said rotary drum, for accommodating a lens, said lens drum being movable in an optical-axis direction of the lens with a rotation of said rotary drum; and an adjusting drum disposed in a subject-side position between said fixed drum and said rotary drum, said adjusting drum thread-engaging with said fixed drum and rotatably supporting said rotary drum, and being rotatable relative to said fixed drum for adjusting a position of said rotary drum with respect to said fixed drum in said optical-axis direction.

2. The lens barrel according to claim 1, further comprising a presser member for regulating a relative position between said adjusting drum and said rotary drum, said presser member being held on said rotary drum and impinging on a subject-side end surface of said adjusting drum.

3. The lens barrel according to claim 1, further comprising a presser member for regulating a relative position between said adjusting drum and said rotary drum, wherein grooves are cut in said rotary drum, and said presser member includes spring portions, inserted in said grooves of said rotary drum, for fixing said presser member by spring forces thereof.

4. The lens barrel according to claim 2, wherein grooves are cut in said rotary drum, and said presser member includes spring portions, inserted in said grooves of said rotary drum, for fixing said presser member by spring forces thereof.

5. A lens barrel comprising:

a first cam drum formed with first cam slots which cut through said first cam drum in a radial direction;

a second cam drum fitted to the exterior of said first cam drum and formed with second cam slots in an inner peripheral surface thereof, said second cam slots extending obliquely across said first cam slots;

said first cam slots opening at an end surface of said first cam drum and said second cam slots opening at an opposite end surface of said second cam drum;

a lens holder, fitted into said first cam drum, for holding a lens internally;

cam pins protruding from an outer periphery of said lens holder and passing through said first cam slots so that tips thereof engage with said second cam slots; and a cam stop member for hindering relative movements of said first and second cam drums in an axial direction, said stop member being fixed to said end surface of said first cam drum at which said first cam slots open and serving to connect end portions of said first cam drum separated by said first cam slots in a circumferential direction.

6. The lens barrel according to claim 5, wherein said second cam slots formed in the inner peripheral surface of said second cam drum are cut in said second cam drum so as to reach an outer peripheral surface thereof.

* * * * *